United States Patent [19]

Nozik

[11] 4,094,751

[45] June 13, 1978

[54] PHOTOCHEMICAL DIODES

[75] Inventor: Arthur J. Nozik, Summit, N.J.

[73] Assignee: Allied Chemical Corporation, Morris Township, N.J.

[21] Appl. No.: 728,474

[22] Filed: Sep. 30, 1976

[51] Int. Cl.² .......................... C25B 1/00; C25B 1/04
[52] U.S. Cl. ..................................... 204/80; 60/641; 204/84; 204/128; 204/129; 204/157.1 R; 204/248; 250/527; 357/85; 429/111
[58] Field of Search .................. 204/80, 84, 128, 129, 204/157.1 R, 248; 250/527; 429/111; 357/87, 85; 60/641; 136/203, 205, 206, 89

[56] References Cited

U.S. PATENT DOCUMENTS

| | | | |
|---|---|---|---|
| 3,650,844 | 3/1972 | Kendall, Jr. et al. | 136/237 |
| 3,914,856 | 10/1975 | Fang | 29/572 |
| 3,924,139 | 12/1975 | Hirose et al. | 250/527 |
| 3,925,212 | 12/1975 | Tchernev | 250/527 |
| 3,956,017 | 5/1976 | Shigemasa | 136/89 HY |
| 3,961,997 | 6/1976 | Chu | 148/174 |
| 3,975,211 | 8/1976 | Shirland | 136/89 |
| 4,011,149 | 3/1977 | Nozik | 204/129 |
| 4,021,323 | 5/1977 | Kilby et al. | 204/129 |

OTHER PUBLICATIONS

F. Shabkhan "The Effect of Illumination on the Anodic Dissolution of Cadmium Sulphide in the Presence of a Redox System,"Ber. Bunsen Phys. Chem., vol. 76, pp. 389-393 (1972).
T. L. Chu et al. "Polycrystalline Silicon Solar Cells on Low Cost Foreign Substrates", Solar Energy, vol. 17, pp. 229-235 (1975).
T. Saitoh et al. "Growth & Structure of Polycrystalline In P Layers on Molybdenum Sheets", J. Electrochem. Soc., vol. 123, pp. 403-406, (Mar. 1976).
P. H. Fang et al. "Polycrystalline Silicon Films on Aluminum Sheets for Solar Cell Application," Appl. Phys. Lett. vol. 25, pp. 1583-584 (1974).
Y. Nakato et al. "Photoelectrochemical Behaviours of Semiconductor Electrodes Coated with Thin Metal Films,"Chemistry Letters, pp. 883-886 (1975).
A. J. Nozik, "p-n Photoelectrolysis Cells,"App. Phys. Lett., vol. 29, pp. 150-153 (1976).
A. J. Nozik, "Photoelectrolysis of Water Using Semiconducting $TiO_2$ Crystals," Nature, vol. 257, pp. 383-386 (1975).
L. L. Vant-Hull et al. "Solar Thermal Power System Based on Optical Transmission," Solar Energy, vol. 18, pp. 31-39 (1976).
T. Wolkenstein, "The Electronic Theory of Photocatalytic Reactions on Semiconductors," pp. 157-208 of Advances in Catalysis, vol. 23, Academic Press, N.Y. (1974).

*Primary Examiner*—Aaron Weisstuch
*Attorney, Agent, or Firm*—David W. Collins; Gerhard H. Fuchs

[57] ABSTRACT

Photochemical diodes are provided which use light to drive both endoergic and exoergic chemical reactions such that optical energy is converted into chemical energy. The photochemical diodes are typically suspended in a bulk volume matrix of the constituent chemical reactants. The photochemical diodes, in the form of either Schottky-type diodes or p-n type diodes, are employed, for example, to convert water into hydrogen plus oxygen (or hydrogen peroxide); to convert hydrogen sulfide into hydrogen plus sulfur; and to photo-catalyze chemical reactions. The photochemical diodes of the invention comprise two portions, a first portion comprising an appropriately doped semiconductor material of a given conductivity and provided with an ohmic contact and a second portion comprising either metal (Schottky-type) or an appropriately doped semiconductor material of a conductivity type opposite to that of the first portion and provided with an ohmic contact (p-n type). The two portions are intimately joined together through the ohmic contact(s). Solar radiation is conveniently employed as a source of optical energy.

40 Claims, 9 Drawing Figures

PHOTOCHEMICAL DIODES

BACKGROUND OF THE INVENTION

1. Field of the Invention

This invention relates to control of endoergic and exoergic chemical reactions by a photoactive entity. More particularly, the invention relates to photoactive entities, herein called "photochemical diodes", which are capable of operating under the influence of solar radiation to drive endoergic chemical reactions such as the photolysis of $H_2O$ into $H_2$ plus $O_2$ and/or $H_2O_2$, and the photolysis of $H_2S$ into $H_2$ plus zero-valence S and to control exoergic catalytic chemical reactions.

2. Description of the Prior Art

The photolysis of water into $H_2$ plus $O_2$ using solar radiation is of prime importance as a potential new energy scheme which involves a renewable and nonpolluting energy source. The conversion of solar energy into chemical energy has the advantage of easy energy storage (in the form of the photogenerated fuel), as compared with solar energy conversion via photovoltaic or photothermal processes. An important process for accomplishing the decomposition of water into $H_2$ plus $O_2$ using solar radiation is photoelectrolysis, such as that disclosed by A. J. Nozik in Vol. 257, *Nature*, page 383 (1975). However, while the photoelectrolysis process disclosed therein represents a considerable advance in the art, the process, like other photoelectrolysis processes, requires two-dimensional thin-film electrodes distributed over very large areas. In order to make solar energy use more viable, a simplification of the system and a reduction in size is required.

Photocatalysis of chemical reactions is well-known; see, e.g., Th. Wolkenstein, Vol. 23, *Advances in Catalysis*, D. D. Eley et al. eds., pp. 157–208, Academic Press, N.Y. 1974. However, no practical devices are disclosed.

SUMMARY OF THE INVENTION

In accordance with the invention, photochemical diodes are provided which drive both endoergic and exoergic chemical reactions with light such that optical energy is converted into chemical energy. The photochemical diode comprises two portions, a first portion comprising an appropriately doped semiconductor material of a given conductivity type and provided with an ohmic contact and a second portion comprising either metal (Schottky-type diode) or an appropriately doped semiconductor material of a conductivity type opposite to that of the first portion and provided with an ohmic contact (*p-n* type diode). The two portions are intimately joined together through the ohmic contact(s).

Also in accordance with the invention, a process is provided for converting optical energy into chemical energy to drive endoergic and exoergic chemical reactions which comprises suspending an assembly of discrete photochemical diodes in a matrix of chemical reactants and illuminating the diodes with optical energy.

Further in accordance with the invention, a cyclical process is provided for converting solar energy into chemical energy and thermal energy. The process comprises suspending an assembly of discrete photochemical diodes in a liquid matrix, exposing the photochemical diodes and the liquid matrix to concentrated solar radiation, forming gaseous fuel and unreacted matrix material at high temperature, converting the thermal content of the high temperature matrix material into electricity by a thermal power generator, simultaneously forming cooled matrix material, recovering the gaseous fuel from the cooled matrix material, adding fresh matrix material to the cooled matrix material and recycling the matrix material for reexposure to the concentrated solar radiation.

Also in accordance with the invention, a process is provided for generating hydrogen from a portion of a body of water, such as a lake or an ocean, using solar radiation. The process comprises suspending an assembly of discrete photochemical diodes in sea water, the diodes being confined to a fixed volume element by membranes permeable to sea water and impermeable to the diodes. Upon exposure to solar radiation, the diodes generate hydrogen, which is collected in an enclosed space above the sea water. The enclosed space is conveniently formed by a transparent polymeric film.

A major practical advantage of the present invention is that the desired photochemical reactions can be achieved in a three-dimensional system in which the photochemical diodes are simply suspended in the bulk volume matrix of the constituent chemical reactants. The photochemical diodes of the invention can be made as small (or as large) as desired, and upon absorption of light, the diodes drive the desired chemical reactions. The reactants constitute a matrix which can be solid, liquid or gaseous phases or combinations thereof. Exemplary devices may drive endoergic reactions, such as photolysis of water by solar radiation, or exoergic reactions, such as photocatalytic-assisted reactions.

DETAILED DESCRIPTION OF THE INVENTION

Photoelectrolysis is a recently discovered process for decomposing water into $H_2$ plus $O_2$ which involves photo-electrochemical processes. In the process, light is absorbed in separate, discrete semiconducting electrodes in contact with electrolyte. The absorbed light produces electron-hole pairs within the electrodes which are subsequently separated by the semiconductorelectrolyte junctions. At the cathode and anode, electrons and holes are respectively injected into the electrolyte, thereby inducing reduction and oxidation reactions, respectively. Hence, an overall photochemical reaction is achieved in two steps: (1) electrons and holes are first created by photo-excitation of semiconducting electrodes, and (2) the electrons and holes drive chemical reactions in an electrochemical cell. Of prime importance is the possibility that this sequence can drive reactions at more favorable energies than can either direct photolysis or electrolysis acting independently. The attractiveness of photoelectrolysis as a solar energy conversion process is that solar energy is converted into chemical energy, which can be stored more easily than either electricity or heat. However, photoelectrolysis requires both large planar semiconductor electrodes which are distributed over large areas and external circuitry for interconnecting the electrodes. The present invention eliminates the need for both large planar electrode systems and external circuitry by the use of an assembly of photoactive entities, called photochemical diodes which, when simply suspended in electrolyte and upon absorption of solar radiation, drive the desired chemical reactions.

In a conventional Schottky-type photoelectrolysis cell, the semiconductor/ohmic contact forms one electrode, while metal, usually platinum, forms the second, or counter-electrode. The two electrodes are separated by the electrolyte, being joined externally by an electrical circuit to provide a path for hole and electron transfer. In a conventional p-n type photoelectrolysis cell, the p-type semiconductor/ohmic contact forms one electrode, while the n-type semiconductor/ohmic contact forms the other electrode. Again, the two electrodes are separated by the electrolyte and are joined externally by an electrical circuit to provide a path for electron and hole transfer.

Contrary to the teachings of the prior art, however, and in accordance with the invention, photochemical diodes are provided which comprise two portions. A first portion comprises an appropriately doped semiconductor material of a given conductivity type and provided with an ohmic contact, and a second portion comprises either metal (Schottky-type diode) or an appropriately doped semiconductor material of a conductivity type opposite to that of the first portion and provided with an ohmic contact. The two portions are intimately joined or bonded together through the ohmic contact(s). In some cases, the ohmic contact and metal portion of the Schottky-type diode are one and the same.

The photochemical diodes of the invention drive both endoergic and exoergic chemical reactions with light such that optical energy, typically of wavelength 3,200 to 25,000 A, is converted into chemical energy. Endoergic reactions require an input of energy to initiate and sustain the reaction, while exoergic reactions release energy during the course of the reaction.

In driving both endoergic and exoergic chemical reactions with optical energy, at least one photochemical diode, and more generally, a plurality, or assembly, of discrete photochemical diodes is suspended in a bulk volume matrix of the chemical reactants. The photochemical diodes may be as small or as large as desired.

Photochemical diodes, like other diodes, may be classified into two types: Schottky-type diodes and p-n type diodes. In the former, an ohmic contact is made to a semiconductor having a bandgap which is consistent with the energetics of the desired photochemical reaction, and a second metallic layer is deposited on top of the ohmic contact. The semiconductor is either p- or n-type, depending upon the reaction system, and the second metallic layer is chosen to provide an efficient and stable charge transfer surface to balance the electron (or hole) injection process that occurs at the semiconductor/matrix interface upon illumination with light. In some cases, one metallic layer can serve both as an ohmic contact to the semiconductor and as an efficient and stable charge transfer surface.

For the Schottky-type photochemical diode consisting of an n-type semiconductor/metal structure, illumination of photochemical diodes suspended in a reactant matrix (i.e., a liquid) results in hole injection at the semiconductor/matrix interface to produce an oxidation reaction and electron injection at the metal/matrix interface to produce a reduction reaction. For a p-type Schottky photochemical diode, electron injection occurs at the p-type semiconductor/matrix interface and hole injection at the metal/matrix interface.

For the p-n type of photochemical diode, ohmic contacts are made to p- and n-type semiconductors having bandgaps consistent with the desired photochemical reactions. The two semiconductors are then intimately joined together through the ohmic contacts. In general, the composition of the ohmic contacts for the p- and n-type semiconductors is different because the required relationship between the work functions of the semiconductor and metal ohmic contact are different for p- and n-type semiconductors. That is, for ohmic contact between p-type semiconductor and metal, the work function for the metal must be greater than that of the semiconductor, while for ohmic contact between n-type semiconductor and metal, the work function of the metal must be less than that of the semiconductor, as is well-known.

For the p-n photochemical diode suspended in a reactant matrix, absorption of light by both halves of the diode results in hole injection (and hence, oxidation) at the n-type semiconductor/matrix interface and electron injection (and hence, reduction) at the p-type semiconductor/matrix interface.

An important feature of the present device is the presence of ohmic contacts between the semiconductor/metal regions of the Schottky-type diode and between the p- and n-type semiconducting regions of the p-n diode.

For Schottky-type diodes, the ohmic contact permits injection of photogenerated majority carriers from the semiconductor into the metal and then into the reactant matrix, while minority carriers are injected from the semiconductor directly into the reactant matrix.

For p-n diodes, the ohmic contact permits recombination of the photogenerated majority carriers in the respective regions of the diode, and thereby allows the minority carriers to be injected into the matrix to complete the current path. That is, photons absorbed in each portion of the p-n photochemical diode create electron-hole pairs; the minority holes (from the n-type portion) and the minority electrons (from the p-type portion) are injected into the matrix. The majority electrons and holes must recombine for current continuity to exist, and this can only happen if ohmic contacts are sandwiched between the p- and n-type semiconducting portions of the diode.

Hence, the photochemical diodes of the invention are basically different from conventional solid state diodes in that minority carriers are injected into the medium (i.e., the bulk volume matrix) outside the photochemical diode. Minority carrier injection permits addition of bandgap energies of p-type and n-type semiconductors in the p-n photochemical diodes of the invention. This is in contrast to conventional diodes, in which majority carriers are injected into the medium outside the diode, for example, into wires leading from a p-n photovoltaic solar cell. Majority carrier injection, moreover, does not permit addition of bandgap energies.

The p-n photochemical diode can comprise either a homotype or heterotype structure. In homotype diodes, the p- and n-type semiconductors are identical except for containing different dopants to produce p- and n-type conductivity. As an example, the diode may consist of GaAs doped with zinc to produce p-type conductivity and GaAs doped with silicon to produce n-type conductivity. In heterotype diodes, the p- and n-type semiconductors are completely different materials. As an example, the diode may consist of GaP doped with zinc to produce p-type conductivity and $TiO_2$ doped with excess titanium (defect $TiO_2$) to produce n-type conductivity.

The p- and n-type semiconductors comprising either a Schottky or a p-n diode are chosen to optimize the efficiency of the diode for the desired chemical reaction. For example, for the endoergic photolytic decomposition of water into $H_2$ plus $O_2$ and/or $H_2O_2$ using Schottky-type photochemical diodes, the semiconductor bandgap ranges from about 1.3 to 3.0 eV; for p-n photochemical diodes, the sum of the bandgaps for both semiconductor electrodes ranges from about 1.3 to 6.0 eV. For the endoergic photolytic decomposition of $H_2S$ into $H_2$ plus S using Schottky-type photochemical diodes, the semiconductor bandgap ranges from about 0.5 to 3 eV; for p-n photochemical diodes, the sum of the bandgaps for both semiconductor electrodes ranges from about 0.5 to 6 eV.

The particle size of the photochemical diodes can be varied over a large range. If the average particle size of the diodes is in the range of about 0.01 to 0.25 $\mu$m, then the diodes can be naturally suspended in the reactant matrix by Brownian motion. For average particle sizes from about 0.25 $\mu$m to 1 mm, the diodes can be suspended in the reactant matrix by agitation, such as mechanical stirring or bubbling of gas. The gaseous evolution from diodes generating, for example, hydrogen from water, also helps to maintain their suspension in liquid. For average particle sizes greater than about 1 mm, the diodes can be mechanically suspended in the reactant matrix, such as by supports.

For average particle sizes less than about 0.01 $\mu$m (100 A), molecular dimensions are approached, and the diodes can be considered to be in solution and acting as a true solute.

For particle sizes less than about 0.25 $\mu$m, two considerations must be taken into account for successful operation of the diodes. First, the absorption coefficient of the diode must be very high in order for sufficient light to be absorbed in each particle to drive the photoelectrochemical reaction. For colloidal diodes (0.01 to 0.25 $\mu$m), the optical absorption coefficient must be greater than about $10^5$ cm$^{-1}$. For solute-type diodes (less than about 0.01 $\mu$m), the optical absorption coefficient must be greater than about $10^6$ cm$^{-1}$.

The second consideration concerns the internal electric fields required to separate the electron-hole pairs in the particle. The fields arise from space charge layers in the particle, the widths $t$ of which are given by:

$$t = (2\epsilon\, V_B/qN)^{1/2}$$

where $V_B$ is the band bending, N is the carrier density, $\epsilon$ is the dielectric constant and $q$ is the electronic charge. Finite electric fields must exist in the diode for efficient electron-hole pair separation; thus, the space charge widths cannot be excessively greater than the particle size of the diode. It is estimated that as an upper limit, the space charge widths can be about 5 to 10 times the particle size; an optimum condition would have the total space charge width about equal to the particle size of the diode. As the particle size of the diode is reduced, the carrier density N can be adjusted by well-known techniques to maintain the proper space charge width described above.

The shape and geometric structure of photochemical diodes is determined by the necessity of minimizing the path length from the region where the electron-hole pairs are created to the ohmic contact. This is necessary in order to reduce electron-hole recombination and to maintain high conversion efficiency. For Schottky-type diodes, this is achieved by minimizing the distance between the ohmic contact and the front surface of the diode upon which the light is incident. The ohmic contact should form a surface which is nominally parallel to the surface of the diode exposed to the light, and the distance between these two surfaces should be minimized within the constraints of maintaining sufficient optical absorption.

For the p-n photochemical diode, two general cases can be considered. In one case, the p- and n-type regions are simultaneously illuminated from one direction; this is labeled the side-by-side configuration. In the second case, the p- and n-type regions are simultaneously illuminated from opposite directions; this is labeled the stacked configuration. In both cases, the distances between the ohmic contacts and the regions where the electron-hole pairs are formed are minimized. Ideally, the ohmic contacts form surfaces which are nominally parallel to the illuminated surfaces of the p- and n-type regions of the diode, and the distances between the ohmic contacts and the front illuminated surfaces are minimized within the constraints of maintaining sufficient optical absorption. For maximum conversion efficiency in p-n photochemical diodes, the relative surface areas of the p-n-type regions must be adjusted such that equal rates of electron-hole pairs are generated in each region. If the absorption coefficients of the p- and n-type regions are identical, then equal areas may be used. Otherwise, the relative areas will have to be adjusted in accordance with the actual absorption coefficients existing in each region.

The photochemical diodes may be constructed from semiconductors which consist either of single crystals, polycrystalline materials or amorphous materials.

The properties of the reactant matrix depend upon the desired reaction. For the photolytic decomposition of water, the aqueous solution may be acidic, neutral or basic and should have a conductivity of at least $10^{-4}$ ohm$^{-1}$cm$^{-1}$. The anodic reaction is controlled by controlling the pH of the electrolyte. In neutral and basic solutions, the primary anodic reaction is $O_2$ evolution via oxidation of hydroxyl ion. In acidic solutions, the formation of hydrogen peroxide occurs at the anode via oxidation of $H_2O$. Low pH solutions (pH less than 5) favor $H_2O_2$ formation over $O_2$ evolution. In a practical system for the generation of hydrogen by $H_2O$ decomposition, it is desirable to have the evolved $H_2$ and $O_2$ separated so that a hazardous, explosive mixture is not present in the system. This separation can be conveniently achieved by forming $H_2O_2$ instead of $O_2$ at the anode of the photochemical diode. Oxygen can then be recovered from solution by decomposing the $H_2O_2$ with either heat or base. Alternatively, the $H_2O_2$ may be separated and recovered by conventional means for use as a valuable oxidizing agent for other chemical reactions. Conventional mechanical methods using membranes to separate $H_2$ and $O_2$ as soon as they form in the system may also be employed. This procedure is difficult for the small particle size diodes, but is convenient for diodes larger than about 1 cm.

For the photolytic decomposition of $H_2S$, the reactant matrix consists of sulfide ions stabilized in solution. The free sulfur content of the solution must be kept low so that it does not compete with $H^+$ ions at the cathode for the reduction reaction. This is done by continuously withdrawing the reactant solution from the cell and adding fresh solution to maintain a constant sulfide ion concentration. The $H_2S$ gas is fed directly to the cell, which, for example, may contain base, to form sulfide ions according to the reaction $$H_2S + 2NaOH \rightarrow Na_2S + 2H_2O$$

The actual photolytic step is:

$$Na_2S + 2H_2O \rightarrow H_2 + S + 2NaOH$$

resulting in the net reaction:

$$H_2S \rightarrow H_2 + S$$

The zero-valence sulfur in this example actually exists as a polysulfide ion in solution.

Besides driving endoergic chemical reactions such as the decomposition of water and of hydrogen sulfide into its elements, photochemical diodes may catalyze exoergic reactions. In this case, the photochemical diodes act as a photocatalyst. For example, hydrogen plus ethylene glycol may be formed from a two phase reaction matrix of water plus ethylene by catalytic action of the photochemical diodes upon exposure to solar radiation.

Preferred compositions for use in the photochemical diodes of the invention are listed in the Table below:

TABLE

| n-type | p-type |
|---|---|
| Miscellaneous | |
| $TiO_2$ | $Cu_2O$ |
| $MTiO_3$, where M is a transition metal element or rare-earth metal element, | $Cu_2S$ |
| $TiO_2$ heavily doped with compensated donor-acceptor pairs such as $Ni^{2+}$—$Sb^{5+}$, $Co^{2+}$—$Sb^{5+}$, etc. | Si, Ce, SiC |
| Si, Te, SiC | |
| II-VI compounds | |
| CdS | CdTe |
| CdSe | ZnTe |
| CdTe | |
| ZnSe | |
| III-V compounds | |
| GaP | GaP |
| GaAs | GaAs |
| InP | InAs |
| AlAs | AlAs |
| AlSb | AlSb |
| GaSb | GaSb |
| | InP |
| Mixed crystals of II-VI compounds | |
|  | |
| Mixed crystals of III-V compounds | |
|  | |

TABLE-continued

| n-type | p-type |
|---|---|
|  | |
| $AI_xGa_{1-x}As$ | |
| Chalcopyrites | Chalcopyrites |
| I-III-$V_2$ compounds | |
| $CuInS_2$ | $CuInS_2$ |
| $AgInSe_2$ | $CuGaS_2$ |
| $AgInS_2$ | $CuAlS_2$ |
| $CuInSe_2$ | $CuAlSe_2$ |
| | $CuInSe_2$ |
| II-IV-$V_2$ compounds | |
| $ZnSiP_2$ | $ZnSiAs_2$ |
| $CdSiP_2$ | $ZnGeP_2$ |
| $CdSnP_2$ | $ZnSnAs_2$ |
| $CdSnAs_2$ | $ZnSnP_2$ |
| | $ZnSnSb_2$ |
| | $CdSnP_2$ |
| | $CdSnAs_2$ |

As is well-known, appropriate selection of dopant elements added to the compositions listed in the above Table dictates the actual conductivity type. At least one appropriately doped semiconductor material of a given conductivity type may be employed.

Of the compositions listed in the above Table, several are photochemically stable in solution and/or have bandgaps ranging from about 1.2 to 2.4 eV. Such compositions are especially preferred. For p-type materials, these preferred compositions include p-doped Si, GaP, GaAs, InP, $CuInS_2$ and $Cu_2O$. For n-type materials, these preferred compositions include n-doped Si, CdS, $TiO_2$, GaP, GaAs, CdSe, InP and $CuInS_2$.

Figure 1:
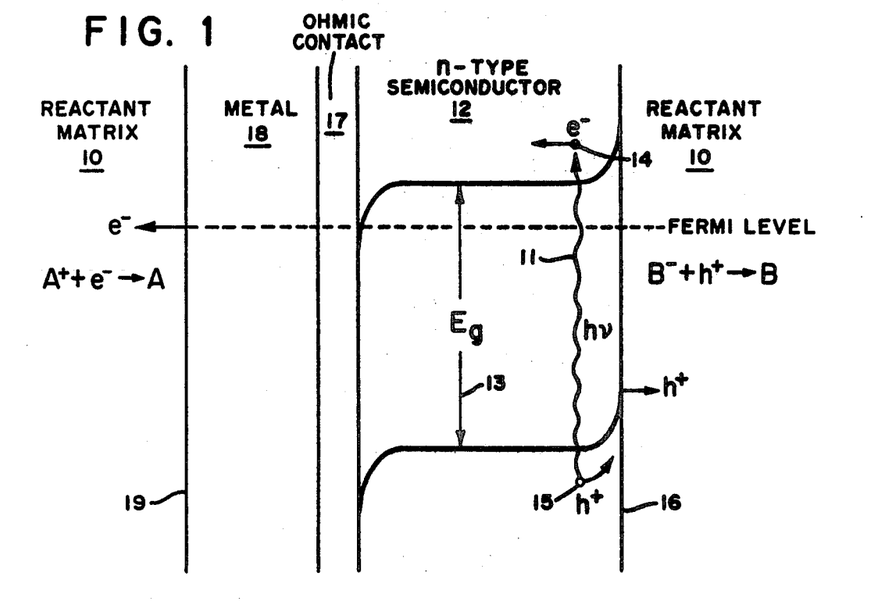
FIG. 1 is an energy level diagram for Schottky-type photochemical diodes.
Figure 2:
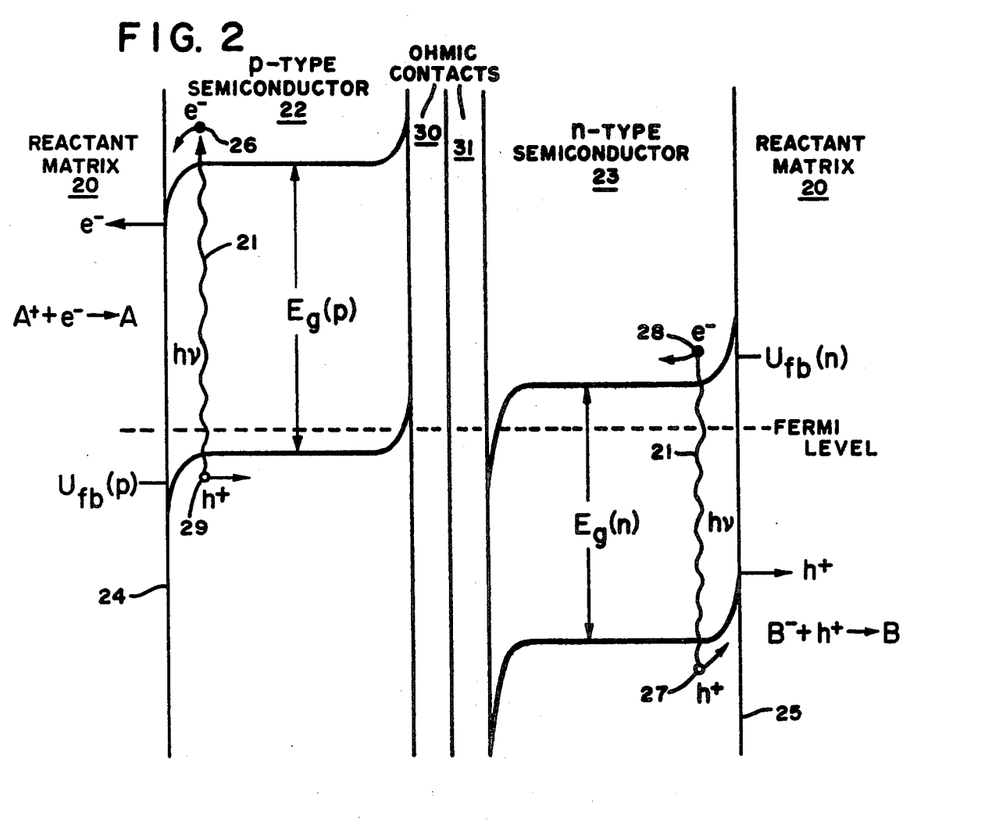
FIG. 2 is an energy level diagram for *p-n* type photochemical diodes.

The mechanism of the operation of the photochemical diode can be understood by referring to FIGS. 1 and 2. In FIG. 1, an energy level scheme for a Schottky-type photochemical diode suspended in a reactant matrix 10 is shown. Absorption of light 11 by n-type semiconductor 12 with energy $h\nu$ greater than that of bandgap $E_g$ 13 results in electron ($e^-$)-hole ($h^+$) pair generation. The electrons 14 and holes 15 separate under the influence of the junction potential created at semiconductor/matrix interface 16. The holes are injected at the semiconductor/matrix interface to drive an oxidation reaction ($B^- + h^+ \rightarrow B$) in the reactant matrix, while the electrons move through ohmic contact 17 and metal layer 18 of the diode to be injected at metal/matrix interface 19 and drive a reduction reaction ($A^+ + e^- \rightarrow A$) in the reactant matrix. Employing p-type semiconductor would result in a reversal of the charge flows.

In FIG. 2, an energy diagram for a p-n type photochemical diode suspended in a reactant matrix 20 is shown. Light 21 of energy $h\nu$ is absorbed in both halves of the diode, creating electron-hole pairs in p-type semiconductor 22 and in n-type semiconductor 23. The electrons and holes separate in each type of semiconductor under the influence of the junction potentials created at p-type semiconductor/matrix interface 24 and n-type semiconductor/matrix interface 25. Thus, minority electrons 26 are injected into the reactant matrix from the p-type semiconductor and minority holes 27 are injected into the reactant matrix from the n-type semiconductor. These processes produce reduction reactions ($A^+ + e^- \rightarrow A$) at the p-type semiconductor/matrix interface 24 and oxidation reactions ($B^- + h^+ \rightarrow B$) at the n-type semiconductor/matrix interface 25. Majority electrons 28 created in the n-type semiconductor and majority holes 29 created in the p-type semiconductor recombine in ohmic contact layers 30 and 31 between the two semiconductor layers.

The energetics of the photochemical diodes can be understood by constructing an energy balance for the two types of diodes. For the Schottky-type diode, the following energy balance equation can be written $$E_g - V_B - (E_c - E_f) = \frac{\Delta G}{F} + \eta_a + \eta_c + iR + V_H \quad (1)$$

where $E_g$ is the bandgap of the semiconducting electrode, $V_B$ is the band bending at the semiconductor/matrix junction, $E_c$ is the conduction band energy, $E_f$ is the Fermi level, $\Delta G/nF$ is the free energy per electron for the overall chemical reaction (1.23 eV for H$_2$O decomposition), $\eta_a$ and $\eta_c$ are the respective overpotentials at the anode and cathode halves of the diode, iR is the ohmic loss, and $V_H$ is the potential drop across the Helmholtz layers in the matrix; see A. J. Nozik, Vol. 29, *Applied Physics Letters*, pp. 150–153 (1976).

The sum of the terms on the left side of Equation (1) represent the net photon energy (as an electron-hole pair) available for doing the electrochemical work indicated by the terms on the right side of Equation (1).

The efficiency of the Schottky-type photochemical diode with respect to sunlight (wavelength about 3,200 to 25,000 A) is limited by the minimum bandgap required to satisfy the energy balance of Equation (1). However, greatly enhanced efficiencies can be achieved in a p-n type photochemical diode. The p- and n-type halves of the diode can be either the same semiconductor (homotype diode) or different semiconductors (heterotype diode), as indicated earlier.

The gross effect in the p-n photochemical diode of the inventon is at least a partial addition, and in some cases a complete addition, of the two bandgap energies, such that higher net photon energies become available for doing reversible and irreversible electrochemical work, compared to a Schottky-type diode. This effect is a consequence of injecting minority carriers into the reactant matrix. For a given chemical reaction, this leads to higher conversion efficiencies with respect to sunlight, since smaller bandgap semiconductors may thus be used. As is well-known, smaller bandgap semiconductors absorb more light and hence provide higher conversion efficiency. The specific available photon energy depends upon the details of the p-n configuration and the semiconductor properties. For the general case of a heterotype p-n photochemical diode:

$$E_g(p) + E_g(n) - [U_{fb}(p) - U_{fb}(n)] + \Delta E_F(p) - \Delta E_F(n) = \quad (2)$$
$$\frac{\Delta G}{nF} + \eta_c(p) + \eta_a(n) + iR + V_H$$

where $(p)$ and $(n)$ refer to the p- and n-type semiconductors, respectively, $\Delta E_F$ is the energy difference between the band edge for the majority carriers and the Fermi level, and $U_{fb}$ is the flat-band potential of the semiconductors. The latter is the semiconductor potential (with respect to the standard calomel electrode) at which the band bending $V_B$ is equal to zero; see the *Applied Physics Letters* reference, above.

For the heterotype p-n photochemical diode, minimization of the difference between the flat-bend potentials of the p- and n-type semiconductors leads to maximization of the net available photon energy. In the upper limit where this difference is zero and $\Delta E_F$ is negligible for both semiconductors, the net available energy is equal to the sum of the bandgap energies of the p- and n-type semiconductors.

For the homotype p-n photochemical diode, the electron affinities of the p- and n-type semiconductors are about equal. This leads to:

$$E_g = \frac{\Delta G}{nF} + \eta_c(p) + \eta_a(n) + iR + V_H \quad (3)$$

Thus, the net energy in this case is equal to the bandgap. For the decomposition of H$_2$O:

$$H_2O(l) \rightarrow H_2(g) + \tfrac{1}{2} O_2(g) \quad (4)$$

where
$\Delta H$ (the enthalpy change of the reaction) = +68.32 kcal/mole = 2.96 eV
$\Delta G$ = +56.69 kcal/mole = 2.46 eV, and
$\Delta G/nF$ = 2.46/2 = 1.23 eV.

Thus, two electron-hole pairs, each with an energy of 1.23 eV, can satisfy the free energy requirements of Equation (4). This means that at least two photons can participate in the decomposition of one water molecule. Operation of a p-n diode leads to an effective participation of more than two photons. Hence, photochemical diodes act as an energy upconversion device and allow the decomposition of water by using visible light; normally, ultraviolet light (2,430 A) is required to photolyze water in a homogeneous system.

A. PHOTOCHEMICAL DIODE CONFIGURATIONS

1. Schottky-type Photochemical Diodes

The Schottky-type photochemical diode of the invention comprises an appropriately doped semiconductor (n- or p-type), an ohmic contact to the semiconductor and a metallic contact to the ohmic contact, the metallic contact having high efficiency for charge (electron or hole) transfer to the reactant matrix. Optionally, an insulating bead may be placed on the surface of the diode between the semiconductor and metal to further improve efficiency. The bandgap of the semiconductor must be consistent with the energy balance indicated in Equation (1). The minimum bandgap is equal to the free energy change per electron, $\Delta G/nF$, for the desired chemical reaction. For the decomposition of H$_2$O, $\Delta G/nF$, = 1.23 eV, the bandgap range is therefore about 1.3 to 3 eV. The latter number represents the upper limit for significant solar absorbance.

Figure 3:
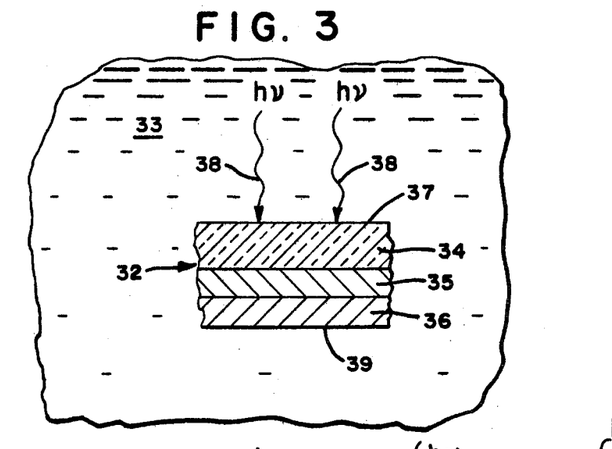
FIG. 3 is a view of a portion of a Schottky-type photochemical diode of the invention in cross-section.

A schematic representation of a portion of a Schottky-type photochemical diode 32 (not to scale) suspended in a reactant matrix 33 is shown in FIG. 3. An appropriately doped semiconductor layer 34 is provided with an ohmic contact 35 on one face of the semiconductor layer. A metallic layer 36 is formed over the ohmic contact. The distance between the ohmic contact and the front surface 37 of the diode is made as small as possible, but consistent with achieving sufficient optical absorption in the semiconductor layer. The semiconductor can be made from either a single crystal, from polycrystalline material, or from amorphous material and it may be of either p- or n-type conductivity. Absorption of light 38 in the semiconductor layer creates electrons and holes (not shown). For n-type semiconductors, electrons move across the ohmic contact to the metallic layer where they are injected through metal/matrix interface 39 into the reactant matrix to produce a reduction reaction (such as H$_2$ evolution). Holes are injected through semiconductor/matrix interface 37 into the reactant matrix to produce an oxidation reaction (such as $O_2$ or $H_2O_2$ formation). The charge flows are reversed for p-type semiconductors. In cases where the ohmic contact catalyzes hydrogen evolution, then the ohmic contact and the metallic layer are identical materials. Indium metal on CdS is an example of such a material. In practice, an assembly of the photochemical diodes is suspended in the reactant matrix.

Figure 4:
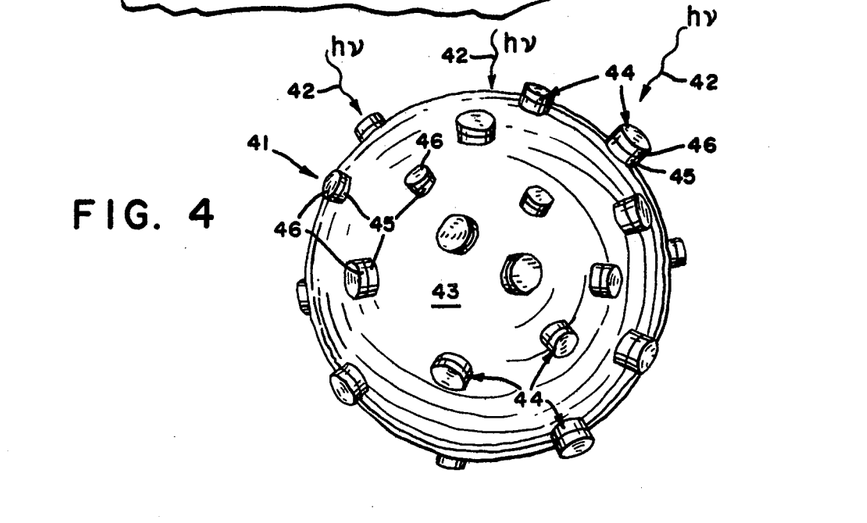
FIG. 4 is a perspective view of a "polka-dot" diode of the invention.

In FIG. 4, another variation of the Schottky-type photochemical diode is shown. The device 41 operates when illuminated by light 42 from any direction. The device comprises a body with a spherical-like inner core 43 of semiconductor material, upon which are formed regular or irregular-shaped portions 44 isolated from each other. The portions 44 comprise a layer 45 in ohmic contact with the semiconductor 43 and upon which layer is deposited a metallic layer 46. In special cases, the ohmic contact and the metallic layer are identical materials, as discussed above. This configuration can also be inverted such that the inner core contains a metal upon which are deposited isolated portions comprising a semiconducting layer deposited over an ohmic contact layer. The relative areas of the semiconductor and metal portions of the device are optimized to produce maximum optical absorption in the semiconductor portion and minimum resistance to $H_2$ evolution in the metal portion.

2. p-n Type Photochemical Diodes

The p-n type photochemical diode of the invention comprises an appropriately doped p-type semiconductor with an ohmic contact and an appropriately doped n-type semiconductor with an ohmic contact which are intimately joined or bonded together through the respective ohmic contacts. Optionally, an insulating bead may be placed on the surface of the diode between the p- and n-type semiconductors to further improve the efficiency of the diode. The p- and n-type semiconductors may be of the same material, except for differences in impurity doping to produce the different types of conductivity (homotype p-n photochemical diode). Alternatively, the p- and n-type semiconductors may be made of different materials (heterotype p-n photochemical diode).

The bandgaps of the two semiconductors must be consistent with energy balance requirements indicated in Equation (2). The minimum bandgap requirement is that the sum of bandgaps of both semiconductors be equal to the free energy change per electron, $\Delta G/nF$, for the desired chemical reaction. For the decomposition of $H_2O$, $\Delta G/nF = 1.23$ eV. Hence, the sum of the bandgaps ranges from about 1.3 to 6.0 eV.

Figure 5A:
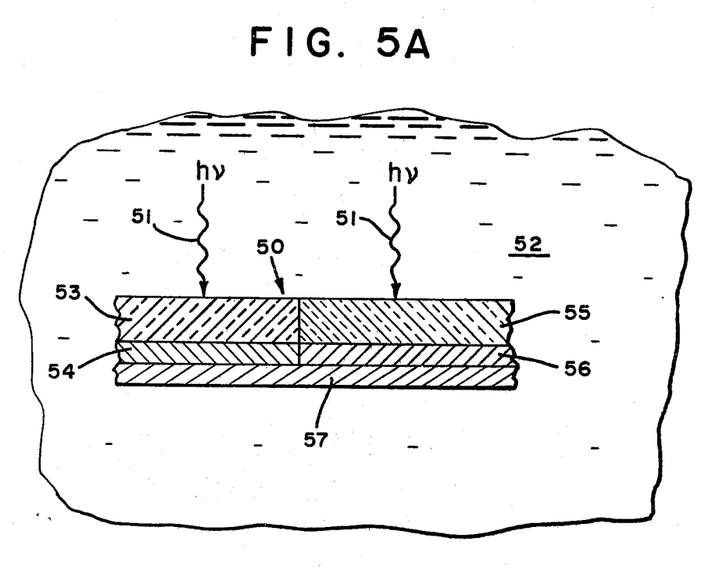
FIG. 5A is a view of a portion of a *p-n* type photochemical diode of the invention in cross-section, depicting a side-by-side configuration.
Figure 5B:
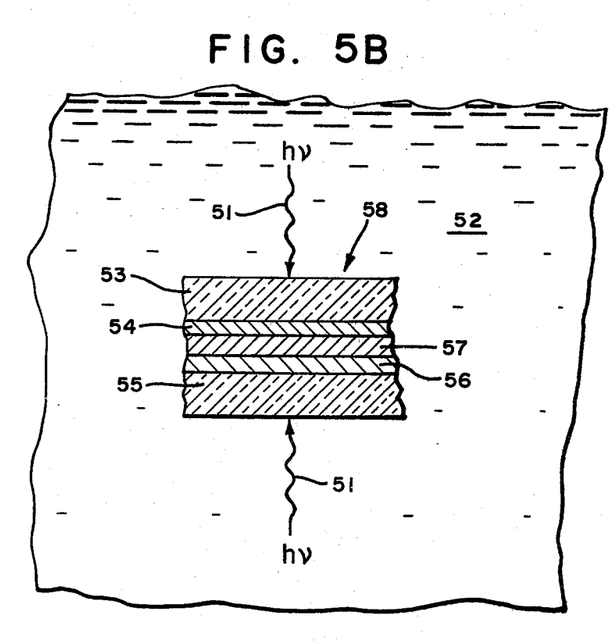
FIG. 5B is a view of a portion of a *p-n* type photochemical diode of the invention in cross-section, depicting a stacked configuration.

Portions of two types of p-n photochemical diodes (not to scale) are depicted in cross-section in FIGS. 5A-B. In FIG. 5A, a side-by-side configuration of diode 50 is shown in which light 51 is incident on the diode from one direction. In FIG. 5B, a stacked configuration of diode 58 is shown in which light 51 is incident on the diode from opposite directions. In both cases, the diode is suspended in a reactant matrix 52. A p-type semiconductor 53 is provided with an ohmic contact 54, and an n-type semiconductor 55 is provided with an ohmic contact 56. The two ohmic contacts are optionally connected through a metal contact 57, which serves to act as a support for the side-by-side configuration. The distance between the ohmic contacts 54 and 56 and the illuminated front surfaces of the semiconductors 53 and 55 are made as small as possible, but consistent with sufficient optical absorption in the semiconductor layers. The stacked configuration depicted in FIG. 5B is related to the side-by-side configuration depicted in FIG. 5A by topological transformations which conserve the requirements of simultaneous illumination of the p- and n-type regions of the diode and minimum distance between the surfaces of the ohmic contacts and the front illuminated surfaces of the p- and n-type semiconductors.

A spherical-like diode can also be formed for a p-n photochemical diode such that the device will operate when illuminated from any direction. Referring to FIG. 4, the inner core 43 may comprise a p- (or n-) type semiconductor while the portions 44 may comprise n- (or p-) type semiconductors which are connected to the inner core through two layers of ohmic contacts (not shown), each layer making ohmic contact to each of the two types of semiconductors. A metallic layer (not shown) may be used to connect the ohmic contacts.

B. NATURE OF THE REACTANT MATRIX

The reactant matrix in which the photochemical diodes are suspended determines the resultant photochemical reactions when the photochemical diodes are illuminated with light. The reactions can be endoergic, such as the photolytic decomposition of water into $H_2$ plus $O_2$ and the photolytic decomposition of hydrogen sulfide into $H_2$ plus zero-valence sulfur, or they can be exoergic, such as the catalytic reaction of water plus ethylene to give $H_2$ plus ethylene glycol. The reactant matrix may be a single phase of solid, liquid, or gas reactants, or a multiphase system containing two or more phases. The conductivity of the reactant matrix should be greater than about $10^{-4}$ ohm$^{-1}$cm$^{-1}$ in order to provide a low ohmic loss in the matrix and high conversion efficiency.

Another important requirement for the reactant matrix is that the reactants in the matrix have effective energy levels which lie between the bandgaps of the semiconductor (Schottky-type) or semiconductors (p-n type) of the photochemical diode. This is necessary so that the photogenerated electron can be transferred from the p-semiconductor (or metal) part of the diode into the reactant matrix, and the photogenerated hole can be transferred from the n-semiconductor part of the diode into the reactant matrix, the electrons and holes being trapped at the respective reduction and oxidation levels of the constituent chemical reactants in the matrix.

C. REACTOR SYSTEMS BASED ON PHOTOCHEMICAL DIODES

Figure 6:
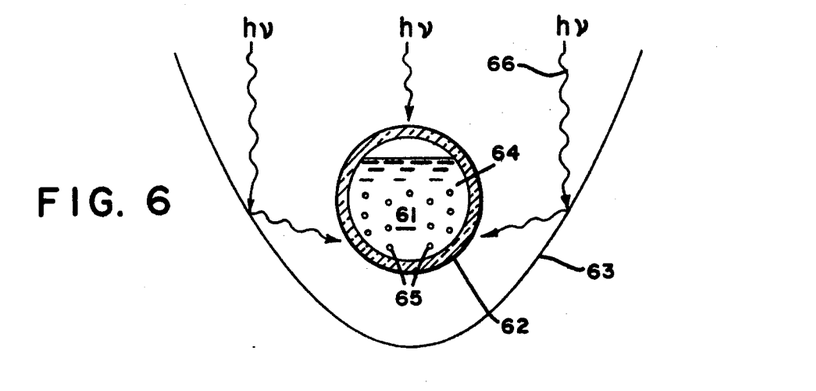
FIG. 6 is a cross-sectional view of a pipe-type solar reactor employing photochemical diodes of the invention suspended in flowing fluid, and combines photochemical and photothermal conversion of solar energy.

FIG. 6 is a cross-sectional view of a pipe-type reactor 61 employing photochemical diodes for the decomposition of water into $H_2$ plus $H_2O_2$ using solar radiation in combination with solar concentrators. A transparent pipe 62 is located at the focus of a concentrating trough collector 63. Flowing through the pipe is an electrolyte 64 containing an assembly of suspended photochemical diodes 65. Sunlight 66, collected and focused onto the pipe by the concentrator and also impinging on the pipe directly, is absorbed by the photochemical diodes. Both $H_2$ and $H_2O_2$ are produced in the pipe and are separated by conventional methods after leaving the solar irradiation section. The photochemical diodes are prevented from leaving the pipe reactor by membranes (not shown) which permit passage of liquid and gas, but not the photochemical diodes. Fresh electrolyte is added as needed to replenish consumed electrolyte.

The pipe-type reactor with trough-like solar concentrators can be replaced by a spherical shaped reactor situated at the top of a tower situated at the focus of a collection of heliostats which are located on the ground surrounding the tower. This general type of solar energy system has been previously described by A. F. Hildebrandt and L. L. Vant-Hull in Vol. 18, *Solar Energy*, pp. 31–41 (1976), and is used for generating heat in a working fluid. The addition of photochemical diodes to the working fluid thus results in generation of hydrogen in addition to heat.

Figure 7:
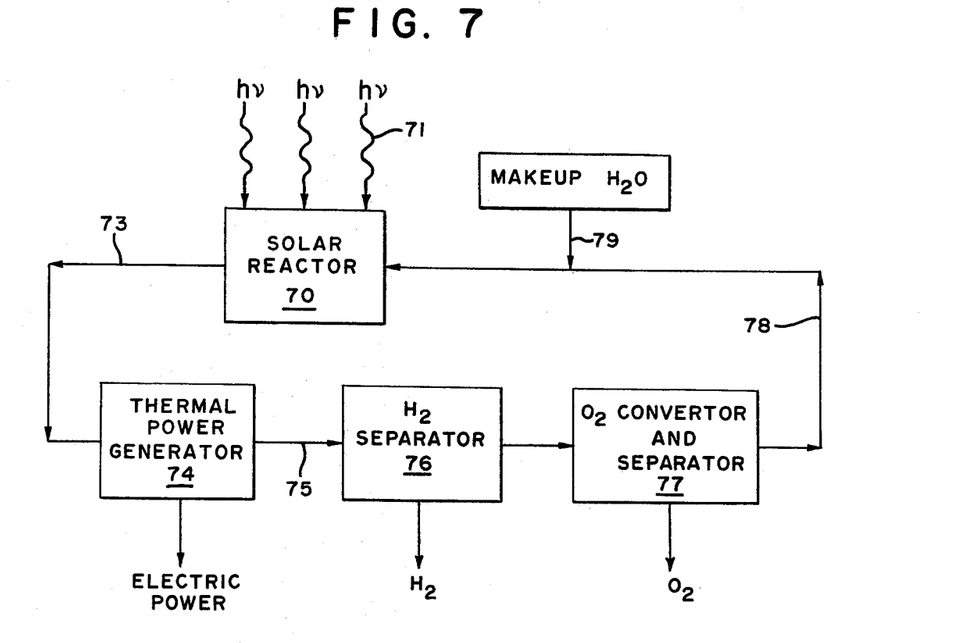
FIG. 7 is a schematic flow diagram of a combined photochemical and photothermal solar energy conversion system.

The two systems described above in which photochemical diodes are added to the working fluid of either a pipe-type solar collector or a tower-type solar collector represent a hybrid cyclical solar energy conversion scheme in which solar radiation is converted into both chemical and thermal energy. Such a hybrid system has the advantage of high conversion efficiency and built-in energy storage. A schematic flow chart of such a cyclical hybrid system is shown in FIG. 7. The hybrid system, employing, for example, a working fluid of water, is used to generate both a gaseous fuel (hydrogen) and electricity (from heated fluids). A solar reactor 70 serves to collect and concentrate solar radiation 71 onto a working fluid, for example, water, containing the photochemical diodes (not shown). The solar reactor can be of several designs, including the power-tower type or trough-type collector. Exit stream 73 from the solar reactor contains hot $H_2O$ and/or steam, hot $H_2$, and hot $H_2O_2$, which has been stabilized by conventional means. This high temperature stream is passed through a thermal power generator 74, such as, for example, a steam turbine, to generate electricity. Exit stream 75 from the thermal power generator contains cooled $H_2O$, $H_2$ and $H_2O_2$. $H_2$ and $O_2$ are recovered and separated from this stream by conventional methods in $H_2$ separator 76 and the $O_2$ convertor and separator 77, respectively. Exit stream 78 from the gas separators contains cold working fluid, which is combined with fresh make-up fluid 79 and fed back to the solar reactor 70. Any $H_2O_2$ that is generated is also recovered, if desired, by conventional means (not shown).

An alternative procedure for operating the hybrid photochemical-photothermal energy conversion system is to form and immediately separate $H_2$ and $O_2$ in the solar reactor by conventional means, such as by using selective membranes. Thus, in FIG. 7, $O_2$ would be removed in the solar reactor and the exit stream 73 would only contain hot $H_2O$ and/or steam and hot $H_2$, and the $O_2$ convertor and separator 77 would not be necessary.

Figure 8:
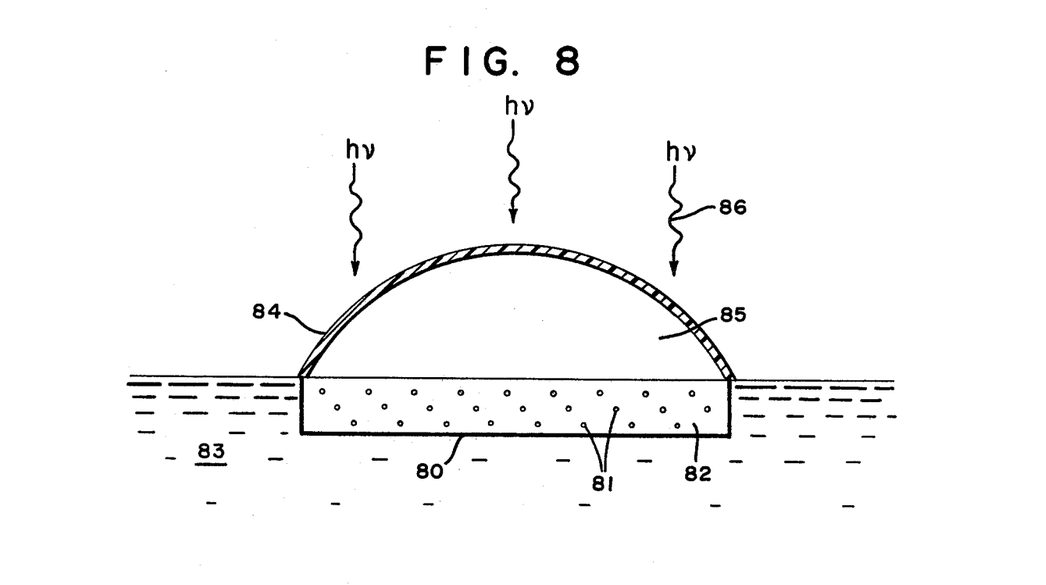
FIG. 8 is a cross-sectional view of a solar energy conversion system for the generation of $H_2$ from a portion of a body of water using photochemical diodes of the invention.

FIG. 8 shows a cross-sectional view of a solar energy conversion system for the generation of $H_2$ from a portion of a large body of water, such as a lake or an ocean, using photochemical diodes. A membrane 80, permeable to water and impermeable to the diodes, serves to confine an assembly of photochemical diodes 81 in a thin volume element 82 of the surface of the body of water 83. A transparent polymeric film 84 covers the volume element and defines a space 85 in which $H_2$ is collected. Solar radiation 86 passes through the polymeric film and is absorbed in the photochemical diodes. The $H_2$ produced is separated by conventional means (not shown) and collected and stored under the polymer cover. The membrane maintains the photochemical diodes within the volume element and allows continuous passage of fresh water into the volume and passage of any $H_2O_2$ produced out of the volume element to maintain an equilibrium condition.

EXAMPLES

The principle of the photochemical diode is described for three systems: n-GaP/Pt in 0.2N $H_2SO_4$, n-$TiO_2$/p-GaP in 0.2N $H_2SO_4$, and n-CdS/Pt in 1N NaOH/S$^=$. The first two systems demonstrate Schottky-type and p-n type diodes operating to decompose $H_2O$; the third system demonstrates a Schottky-type diode decomposing $H_2S$.

The Schottky-type diodes were constructed by first evaporating metallic (ohmic) contacts on the crystals, followed by the sputtering or bonding (via silver epoxy cement) of a P$t$ layer. Immersion of the diode in the respective electrolyte and exposure of the semiconductor face either to sunlight or to simulated sunlight from a xenon lamp resulted in vigorous $H_2$ evolution from the P$t$ surface. $H_2$ evolution could also be obtained with just the ohmic contact, but the rate of evolution was not as rapid as with P$t$.

The p-n diode was constructed from single crystals of n-$TiO_2$ and p-GaP bonded together through ohmic contacts with silver epoxy cement. Illumination of both sides of the sandwich structure with light resulted in formation of $H_2$ and a combination of $O_2$ and $H_2O_2$ on the p- and n-type crystals, respectively. The rate of gas formation in this system was very slow, however, due to the low conversion efficiency of this particular diode system.

A. PHOTOCHEMICAL DIODES IN ENDOERGIC PHOTOLYTIC REACTIONS

Example 1

A Schottky-type photochemical diode for the evolution of hydrogen was constructed from n-type GaP and platinum metal. A single crystal platelet of GaP, oriented in the (111) direction, doped with sulfur to produce an n-type conductivity of 10 ohm$^{-1}$cm$^{-1}$ and having a thickness of 1 mm and a cross-sectional area of 0.6 cm$^2$, was polished with 0.3 $\mu$m $Al_2O_3$ abrasive and then etched for 5 min at 60° C in a solution consisting of 1 part $H_2O$, 1 part $H_2O_2$ and 3 parts $H_2SO_4$. An ohmic contact was formed on the Ga face by evaporating 3000 A of a 2% Si-98% Au alloy and then heat treating the GaP crystal in $H_2$ at 600° C for 10 minutes. A Pt film with a thickness of 4000 A was deposited over the ohmic contact by DC sputtering from a Pt target. When this photochemical diode was suspended in 0.2N $H_2SO_4$ and the GaP face was illuminated with simulated or natural sunlight, $H_2$ gas vigorously evolved from the Pt face. The power conversion efficiency for $H_2$ evolution was about 10% conversion of incident solar radiation.

Example 2

A Schottky-type photochemical diode was constructed as in Example 1, except that an insulating bead of epoxy was formed around the outer edge of the diode between the GaP and Pt faces. This resulted in a higher rate of $H_2$ evolution.

Example 3

A Schottky-type photochemical diode was constructed as in Example 2, except that a 1 mil Pt foil was cemented to the ohmic contact to form the diode. The efficiency for H₂ evolution was substantially the same as in Example 2.

Example 4

A Schottky-type photochemical diode was constructed as in Example 2, except no Pt layer was formed over the Si-Au layer. The ohmic contact, hence, also served as the H₂ evolving face. The rate of H₂ evolution was lower in this case.

Example 5

A $p$-$n$ type photochemical diode for the decomposition of water into $H_2$ and $O_2$ was constructed from $n$-type $TiO_2$ and $p$-type GaP. A single crystal wafer of $n$-type rutile $TiO_2$, with the $c$-axis in the wafer plane, having a thickness of 1 mm and a cross-sectional area of 0.5 cm², was reduced in 1 atm of $H_2$ at 800° C for 5 min to produce a conductivity of 0.3 ohm$^{-1}$cm$^{-1}$. The crystal was etched in aqua regia at 60° C for 3 min, and a 3000 A thick layer of indium was then evaporated onto one face of the $TiO_2$ crystal to form an ohmic contact.

A single crystal wafer of $p$-type GaP, oriented in the (110) direction, doped with Zn to produce a $p$-type conductivity of 3.0 ohm$^{-1}$cm$^{-1}$, and having a thickness of 0.8 mm and a cross-sectional area of 0.5 cm², was polished with 0.3 μm $Al_2O_3$ abrasive and then etched for 5 min at 60° C in a solution consisting of 1 part $H_2O_2$, and 1 part $H_2O$ and 3 parts $H_2SO_4$. An ohmic contact was then formed on one face by evaporating 3000 A of a 1% Zn-99% Au alloy, overcoating this layer with 1 μm of gold and then heat treating the GaP crystal in $H_2$ at 600° C for 10 minutes.

The n-$TiO_2$ crystal and the p-GaP crystal were then cemented together with silver epoxy to form a $p$-$n$ type photochemical diode having a total thickness of about 2 mm and a cross-sectional area of about 0.5 cm². An insulating bead of epoxy cement was placed around the outside edge of the diode at the junction between the p-GaP and n-$TiO_2$ crystal sections.

When this diode was suspended in 0.2N $H_2SO_4$ and both sides of the diode illuminated with simulated sunlight, $H_2$ gas was evolved from the p-GaP face and a mixture of $O_2$ and $H_2O_2$ was evolved from the n-$TiO_2$ face. The efficiency for $H_2$ evolution was about 0.3%.

Example 6

A Schottky-type photochemical diode for the decomposition of $H_2S$ into $H_2$ and S was constructed from $n$-type CdS and Pt metal. A single crystal platelet of CdS having a conductivity of 2 ohm$^{-1}$cm$^{-1}$, a thickness of 1 mm and a cross-sectional area of 0.5 cm², was etched in cold concentrated HCl for 1 min; an ohmic contact was then formed on one face of the platelet by evaporating 3000 A of indium and heat treating the crystal in $H_2$ at 200° C for 5 min. A film of Pt with a thickness of 4000 A was deposited over the ohmic contact by DC sputtering from a Pt target.

When this diode was suspended in a solution containing 1M NaOH and 1M $Na_2S$ and illuminated with natural sunlight or simulated sunlight, $H_2$ gas evolved vigorously from the Pt face. A zero-valence sulfur species was formed at the CdS face in the form of polysulfide ion. This was evidenced by a gradual change in the color of the solution from colorless to yellow as the zero-valence sulfur content increased. The $Na_2S$ was formed by passing $H_2S$ gas into NaOH solution. The efficiency for $H_2$ evolution was about 7%.

Example 7

A Schottky-type photochemical diode was constructed as in Example 6, except that a 1 mil Pt foil was cemented to the ohmic indium contact to form the diode structure. The efficiency for $H_2$ evolution was about 7%.

Example 8

A Schottky-type photochemical diode was constructed as in Example 6, except that an insulating bead of epoxy cement was formed around the edge of the diode between the CdS and Pt sections. This resulted in a higher rate of $H_2$ evolution.

Example 9

A Schottky-type photochemical diode was constructed by depositing a polycrystalline thin film of CdS having a thickness of 30 m, and conductivity of about $10^{-2}$ ohm$^{-1}$cm$^{-1}$ on a film of conducting $Cd_2SnO_4$. A Pt film is also deposited on the $Cd_2SnO_4$ film next to the CdS film. Illumination of the CdS film with natural or simulated sunlight results in $H_2$ evolution from the Pt film and polysulfide formation at the CdS film.

Example 10

An assembly of Schottky-type photochemical diodes comprising an appropriately doped semiconductor body of $n$-type GaP and a layer of metallic platinum intimately joined thereto is suspended in an electrolyte having a conductivity of at least about $10^{-4}$ ohm$^{-1}$ cm$^{-1}$. Upon exposure of the suspended assembly of photochemical diodes to solar radiation, $H_2$ is evolved.

Example 11

An assembly of $p$-$n$ type photochemical diodes is suspended in an electrolyte having a conductivity of about $10^{-4}$ ohm$^{-1}$ cm$^{-1}$. The diodes comprise an appropriately doped semiconductor body of $n$-type $TiO_2$ provided with an ohmic contact of metallic indium and an appropriately doped semiconductor body of $p$-type GaP provided with an ohmic contact of a Zn-Au alloy. The ohmic contacts are intimately joined together. Upon exposure of the suspended assembly of photochemical diodes to solar radiation, $H_2$ is evolved.

B. PHOTOCHEMICAL DIODES IN EXOERGIC PHOTOCATALYTIC REACTIONS

Example 12

A $p$-$n$ type photochemical diode is constructed as in Example 5. The photochemical diode is then suspended in a two phase system consisting of water and ethylene. Illumination of both sides of the diode with sunlight results in $H_2$ evolution from the p-GaP face and ethylene glycol formation on the n-$TiO_2$ face.

Example 13

A $p$-$n$ type photochemical diode is constructed as in Example 5, except that the diode is suspended in a two phase mixture of HCl solution and ethylene. Hydrogen and ethylene dichloride are produced upon exposure of the diode to sunlight.

What is claimed is:

1. A photochemical diode comprising two portions, a first portion comprising at least one appropriately doped $p$-type semiconductor material provided with an ohmic contact over a portion thereof and a second portion comprising at least one appropriately doped n-type semiconductor material provided with an ohmic contact over a portion thereof and joined to said first portion through both said ohmic contacts.

2. The photochemical diode of claim 1 in which the appropriately doped p-type semiconductor material consists essentially of at least one p-doped member selected from the group consisting of Si, GaP, GaAs, InP, CuInS$_2$ and Cu$_2$O.

3. The photochemical diode of claim 1 in which the appropriately doped n-type semiconductor material consists essentially of at least one n-doped member selected from the group consisting of Si, CdS, TiO$_2$, GaP, GaAs, CdSe, InP and CuInS$_2$.

4. The photochemical diode of claim 1 additionally comprising an insulating bead on the surface of the diode between the two joined portions.

5. A process for converting optical energy into chemical energy to drive a chemical reaction in a matrix of chemical reactants which comprises suspending an assembly of discrete photochemical diodes in the reactant matrix and illuminating the diodes with optical energy, the diodes each comprising two portions, a first portion comprising at least one appropriately doped semiconductor material of a given conductivity type and provided with an ohmic contact over a portion thereof, and a second portion comprising either metal which is joined to said first portion through said ohmic contact or at least one appropriately doped semiconductor material of a given conductivity type opposite to that of said first portion, provided with an ohmic contact over a portion thereof and joined to said first portion through both said ohmic contacts.

6. The process of claim 5 in which exoergic chemical reactions in a matrix of chemical reactants are catalyzed.

7. The process of claim 5 in which endoergic chemical reactions in a matrix of chemical reactants are driven.

8. The process of claim 5 in which the optical energy is provided by solar radiation.

9. The process of claim 5 in which the chemical reaction comprises photolytic decomposition of water into hydrogen plus at least one of oxygen and hydrogen peroxide.

10. The process of claim 5 in which the chemical reaction comprises photolytic decomposition of hydrogen sulfide into hydrogen plus zero-valence sulfur.

11. The process of claim 5 in which the first portion of the diodes comprises appropriately doped p-type semiconductor material provided with an ohmic contact and the second portion of the diodes comprises appropriately doped n-type semiconductor material provided with an ohmic contact.

12. The process of claim 11 in which the relative surface areas of the p- and n-type regions are such that substantially equal rates of electron-hole pairs are generated in each portion.

13. The process of claim 5 in which the first portion comprises appropriately doped p-type semiconductor material provided with an ohmic contact and the second portion comprises metal.

14. The process of claim 5 in which the first portion comprises appropriately doped n-type semiconductor material provided with an ohmic contact and the second portion comprises metal.

15. The process of claim 5 in which the appropriately doped semiconductor material of a given conductivity type consists essentially of at least one p-doped member selected from the group consisting of Si, GaP, GaAs, InP, CuInS$_2$ and Cu$_2$O.

16. The process of claim 5 in which the appropriately doped semiconductor material of a given conductivity consists essentially of at least one n-doped member selected from the group consisting of Si, CdS, TiO$_2$, GaP, GaAs, CdSe, InP and CuInS$_2$.

17. The process of claim 5 in which the diodes have an average particle size less than about 0.01 micrometer and form a solution of molecular-sized diodes in the reactant matrix.

18. The process of claim 5 in which the diodes have an average particle size of about 0.01 to 0.25 micrometer and form a colloidal suspension in the reactant matrix.

19. The process of claim 5 in which the diodes have an average particle size of about 0.25 micrometer to 1 mm and are suspended in the reactant matrix by external agitation.

20. The process of claim 5 in which the diodes have an average particle size greater than about 1 mm and are mechanically suspended in the reactant matrix.

21. The process of claim 5 in which the semiconductor material of each portion is thin enough to minimize the path length between the region where electron-hole pairs are created by action of the optical energy and the ohmic contact of the semiconductor material and thick enough to maintain sufficient optical absorption of the optical energy.

22. The process of claim 5 in which each ohmic contact to a semiconductor material forms a surface which is parallel to the illuminated surface at that semiconductor material.

23. A cyclical process for converting solar energy into chemical energy and thermal energy which comprises suspending an assembly of discrete photochemical diodes in a liquid matrix, the photochemical diodes comprising two portions, a first portion comprising at least one appropriately doped semiconductor material of a given conductivity type and provided with an ohmic contact over a portion thereof and a second portion comprising either metal which is joined to said first portion through said ohmic contact or at least one appropriately doped semiconductor material of a conductivity type opposite to that of the first portion, provided with an ohmic contact over a portion thereof and joined to said first portion through both said ohmic contacts, exposing the photochemical diodes and the liquid matrix to concentrated solar radiation, forming gaseous fuel from the liquid matrix and unreacted matrix material at high temperature, converting the thermal content of the high temperature matrix material into electricity by a thermal power generator and forming cooled matrix material, recovering the gaseous fuel from the cooled matrix material, adding fresh liquid matrix to the cooled matrix material, and recycling the matrix material for reexposure to the concentrated solar radiation.

24. The process of claim 23 in which the matrix comprises water and the gaseous fuel comprises hydrogen.

25. A process for generating hydrogen from a portion of a body of water using solar radiation comprising suspending an assembly of discrete photochemical diodes in the water, the photochemical diodes comprising two portions, a first portion comprising at least one appropriately doped semiconductor material of a given conductivity type and provided with an ohmic contact over a portion thereof and a second portion comprising either metal which is joined to said first portion through said ohmic contact or at least one appropriately doped semiconductor material of a conductivity type opposite to that of said first portion, provided with an ohmic contact over a portion thereof and joined to said first portion through both said ohmic contacts, confining the diodes to a fixed volume element by membranes permeable to the water and impermeable to the diodes, and collecting evolved hydrogen in a space above the water formed by a transparent polymer film.

26. In combination:
(a) a matrix of chemical reactants; and
(b) an assembly of discrete photochemical diodes suspended in the reactant matrix, the photochemical diodes comprising two portions, a first portion comprising at least one appropriately doped semiconductor material of a given conductivity type and provided with an ohmic contact over a portion thereof and a second portion comprising either metal which is joined to said first portion through said ohmic contact or at least one appropriately doped semiconductor material of a conductivity type opposite to that of said first portion, provided with an ohmic contact over a portion thereof and joined to said first portion through both said ohmic contacts.

27. The combination of claim 26 in which the matrix of chemical reactants contains substances for exoergic chemical reactions catalyzed by the assembly of photochemical diodes.

28. The combination of claim 26 in which the matrix of chemical reactants contains substances for endoergic chemical reactions catalyzed by the assembly of photochemical diodes.

29. The combination of claim 26 further comprising means for impinging solar radiation on the assembly of photochemical diodes.

30. The combination of claim 26 in which the matrix of chemical reactants includes a solution comprising water.

31. The combination of claim 26 in which the matrix of chemical reactants includes a solution comprising hydrogen sulfide.

32. The combination of claim 26 in which the diodes have an average particle size less than about 0.01 micrometer and form a solution of molecular-sized diode in the reactant matrix.

33. The combination of claim 26 in which the diodes have an average particle size of about 0.01 to 0.25 micrometer and form a colloidal suspension in the reactant matrix.

34. The combination of claim 26 in which the diodes have an average particle size of about 0.25 micrometer to 1 mm and are suspended in the reactant matrix by external agitation.

35. The combination of claim 26 in which the diodes have an average particle size greater than about 1 mm and are mechanically suspended in the reactant matrix.

36. The combination of claim 26 in which the first portion of the diodes comprises appropriately doped $p$-type semiconductor material provided with an ohmic contact and the second portion of the diodes comprises appropriately doped $n$-type semiconductor material provided with an ohmic contact.

37. The combination of claim 26 in which the first portion of the diodes comprises appropriately doped $p$-type semiconductor material provided with an ohmic contact and the second portion comprises metal.

38. The combination of claim 26 in which the first portion of the diodes comprises appropriately doped $n$-type semiconductor material provided with an ohmic contact and the second portion comprises metal.

39. The combination of claim 26 in which the appropriately doped semiconductor material of a given conductivity type consists essentially of at least one $p$-doped member selected from the group consisting of Si, GaP, GaAs, InP, $CuInS_2$ and $Cu_2O$.

40. The combination of claim 26 in which the appropriately doped semiconductor material of a given conductivity type consists essentially of at least one $n$-doped member selected from the group consisting of Si, CdS, $TiO_2$, GaP, GaAs, CdSe, InP and $CuInS_2$.

* * * * *

UNITED STATES PATENT OFFICE — Page 1 of 2
CERTIFICATE OF CORRECTION

Patent No. 4,094,751　　　　Dated June 13, 1978

Inventor(s) Arthur J. Nozik

It is certified that error appears in the above-identified patent and that said Letters Patent are hereby corrected as shown below:

Col. 3, line 53, "A" should read --$\overset{\circ}{A}$--.

Col. 5, line 51, "A" should read --$\overset{\circ}{A}$--.

Col. 7, line 53, "Ce" should read --Ge--.

Col. 9, line 25, "A" should read --$\overset{\circ}{A}$--.

Col. 10, line 29, "A" should read --$\overset{\circ}{A}$--.

Col. 14, line 47, "A" should read --$\overset{\circ}{A}$--.

Col. 14, line 49, "A" should read --$\overset{\circ}{A}$--.

Col. 15, line 20, "A" should read --$\overset{\circ}{A}$--.

Col. 15, line 29, "A" should read --$\overset{\circ}{A}$--.

UNITED STATES PATENT OFFICE
CERTIFICATE OF CORRECTION

Patent No. 4,094,751         Dated June 13, 1978

Inventor(s) Arthur J. Nozik

It is certified that error appears in the above-identified patent and that said Letters Patent are hereby corrected as shown below:

Col. 15, line 55, "A" should read --Å--.

Col. 15, line 57, "A" should read --Å--.

Col. 18, line 33, "at" should read --of--.

Col. 20, line 9, "diode" should read --diodes--.

Signed and Sealed this

Fourteenth Day of August 1979

[SEAL]

Attest:

LUTRELLE F. PARKER

Attesting Officer    Acting Commissioner of Patents and Trademarks